United States Patent [19]
Sorenson

[11] Patent Number: 5,986,841
[45] Date of Patent: Nov. 16, 1999

[54] DISC DRIVE HAVING A SERIAL PREAMPLIFIER INTERFACE WITH BROADCAST MODE ADDRESSING

[75] Inventor: Scott G. Sorenson, Lakeville, Minn.

[73] Assignee: Seagate Technology, Inc., Scotts Valley, Calif.

[21] Appl. No.: 08/864,501

[22] Filed: May 29, 1997

Related U.S. Application Data

[60] Provisional application No. 60/040,568, Mar. 14, 1997.

[51] Int. Cl.⁶ .............................. G11B 5/02; G11B 5/09
[52] U.S. Cl. .................................. 360/68; 360/46
[58] Field of Search ................. 395/200.57; 386/72; 352/11; 360/61, 62, 64, 67, 106, 46, 68

[56] References Cited

U.S. PATENT DOCUMENTS

| | | | |
|---|---|---|---|
| 4,488,185 | 12/1984 | Toba | 386/52 |
| 4,768,111 | 8/1988 | Kranabetter | 360/62 |
| 5,293,278 | 3/1994 | Pahr | 360/67 |
| 5,373,402 | 12/1994 | Price et al. | 360/61 |
| 5,488,518 | 1/1996 | Shier | 360/46 X |
| 5,726,821 | 3/1998 | Cloke et al. | 360/25 X |
| 5,771,076 | 6/1998 | Kim | 348/524 |

*Primary Examiner*—W. Chris Kim
*Attorney, Agent, or Firm*—Westman, Champlin & Kelly, P.A.

[57] ABSTRACT

A disc drive includes a recording head preamplifier circuit having a plurality of preamplifiers. Each preamplifier includes a receiver circuit and a preamplifier enable circuit. The receiver circuit receives a serial command having command address bits. The preamplifier enable circuit is operatively coupled to the receiver circuit and generates an enable output for enabling the preamplifier when the command address bits match a first predetermined logic pattern which is unique to chat preamplifier and when the command address bits match a second predetermined logic pattern which is universal to the plurality of preamplifiers.

17 Claims, 5 Drawing Sheets

DISC DRIVE HAVING A SERIAL PREAMPLIFIER INTERFACE WITH BROADCAST MODE ADDRESSING

CROSS-REFERENCE TO RELATED APPLICATION

This application claims priority from U.S. Provisional Application Ser. No. 60/040,568, which was filed on Mar. 14, 1997 and is entitled BROADCAST MODE ADDRESSING SCHEME.

BACKGROUND OF THE INVENTION

The present invention relates to disc drive storage systems and, in particular, to a disc drive storage system having a serial preamplifier interface with broadcast mode addressing for enabling multiple preamplifiers individually and simultaneously.

Disc drives of the "Winchester" type are well known in the industry. Such drives use rigid discs coated with a magnetizable medium for storage of digital information in a plurality of circular, concentric data tracks. The discs are mounted in a pack on a spindle motor which causes the discs to spin and the surfaces of the discs to pass under respective hydrodynamic (e.q. air) bearing disc head sliders. The sliders carry transducers known as heads which read information from and write information to the respective disc surfaces through one or more read and write preamplifiers. High storage capacity disc drives typically have a large number of heads and thus have multiple read and write preamplifiers. Each read and write preamplifier drives a plurality of individual heads, typically on a multiplexed basis.

An actuator mechanism moves the heads from track to track across the surfaces of the discs under control of a drive controller located within the disc drive. The actuator mechanism includes a track accessing arm and a suspension for each head gimbal assembly. The drive controller positions the heads based on address information received from a host processor and servo information that is written on the disc surfaces.

The servo information is written on the disc surfaces during manufacture of the disc drive. With high volume production, it is desirable to reduce the number of disc revolutions that is required to write the servo information onto the disc pack since added revolutions directly translate to added time in the manufacturing process. One method used for reducing the number of revolutions is to read and write with all of the preamplifiers simultaneously. In this method, each preamplifier has its own set of serial interface control inputs and its own set of read and write signal wires. This adds pins and signal wires to the printed circuit board (PCB) interface connector and the flex cable which are coupled between the disc drive electronics and the actuator assembly, where space is already an issue. Another difficulty with adding pins and signal wires to the disc drive is that it increases susceptibility to noise. Therefore, it is very undesirable to add pins or signal wires within the disc drive assembly. The present invention provides a solution to this and other problems, and offers other advantages over the prior art.

SUMMARY OF THE INVENTION

The present invention relates to a disc drive having a plurality of read and write preamplifiers with a common serial interface that supports individual and broadcast mode addressing, which solves the above-mentioned problems.

In accordance with one embodiment of the present invention, each preamplifier includes a receiver circuit and a preamplifier enable circuit. The receiver circuit receives a serial command having command address bits. The preamplifier enable circuit is operatively coupled to the receiver circuit and generates an enable output which enables the preamplifier when the command address bits match a first predetermined logic pattern which is unique to that preamplifier and when the command address bits match a second predetermined logic pattern which is universal to the plurality of preamplifiers.

In another aspect of the present invention, a method of addressing a plurality of preamplifiers in a disc drive system is provided. The method includes defining unique logic patterns for each of the preamplifiers and a universal logic pattern for the plurality of preamplifiers. A serial command signal having a command address is transmitted to the plurality of preamplifiers simultaneously over a common serial command line. The method further includes enabling each preamplifier for which the command address matches the unique logic pattern of that preamplifier and enabling the plurality of preamplifiers if the command address matches the universal logic pattern.

These and various other features as well as advantages which characterize the present invention will be apparent upon reading of the following detailed description and review of the associated drawings.

DETAILED DESCRIPTION OF THE PREFERRED EMBODIMENTS

Figure 1:
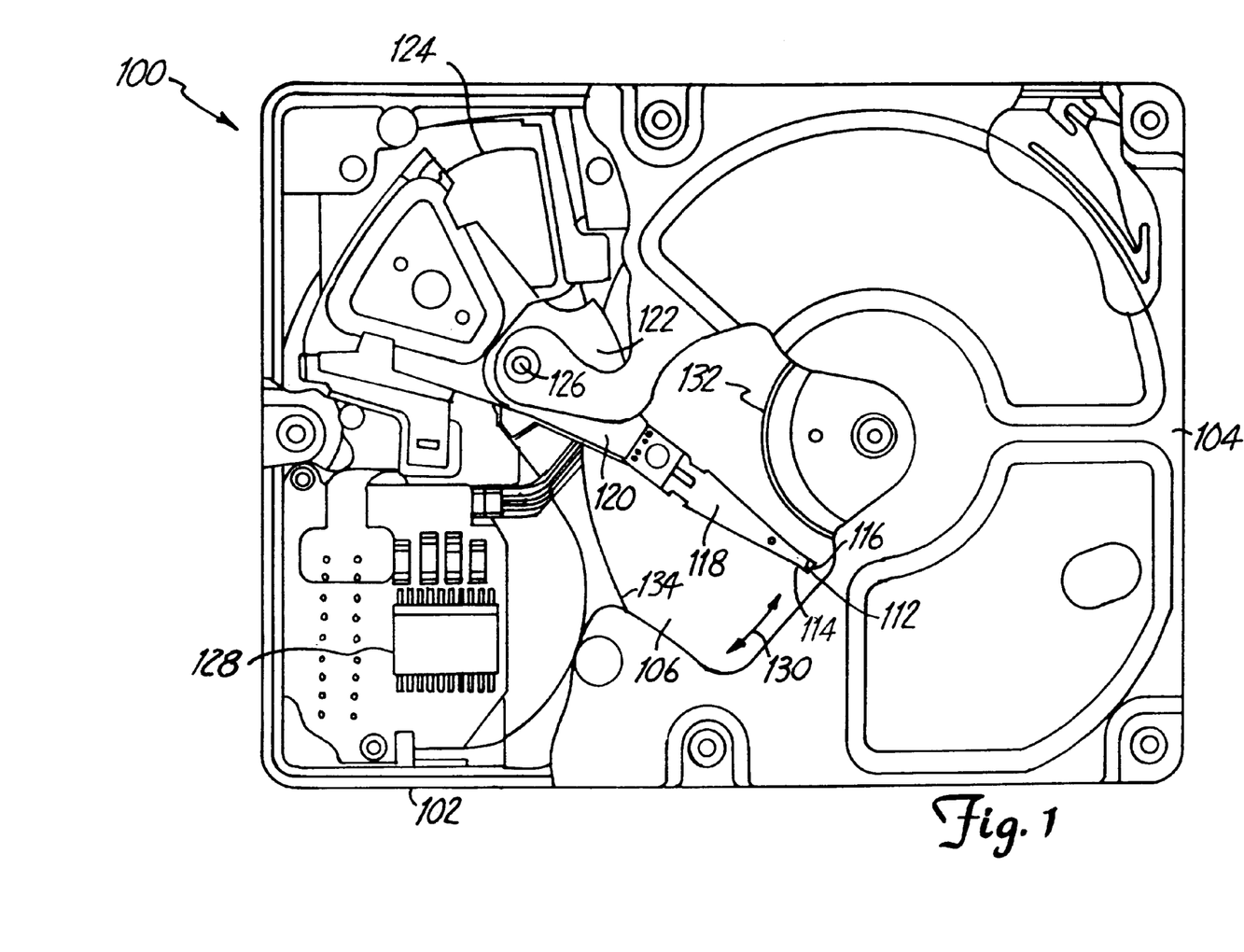
FIG. 1 is a top plan view of a disc drive according to one embodiment of the present invention.

FIG. 1 is a plan view of a disc drive 100 according to the present invention. Disc drive 100 includes a housing with a base 102 and a top cover 104 (sections of top cover 104 are removed for clarity) Disc drive 100 further includes a disc pack 106, which is mounted on a spindle motor (not shown) by a disc clamp 108. Disc pack 106 includes a plurality of individual discs which are mounted for co-rotation about a central axis. Each disc surface has an associated head gimbal assembly (HGA) 112 which is mounted to disc drive 100 for communication with the disc surface. Each HGA 112 includes a gimbal 114 arid a slider 116, which carries one or more read and write heads. In the example shown in FIG. 1, HGAs 112 are supported by suspensions 118 which are in turn attached to track accessing arms 120 of an actuator assembly 122.

The actuator shown in FIG. 1 is of the type known as a rotary moving coil actuator and includes a voice coil motor (VCM), shown generally at 124. Voice coil motor 124 rotates actuator assembly 122 with its attached heads about a pivot shaft 126 to position the heads over a desired data track under the control of servo control circuitry 128. HGA 112 travels along an arcuate path 130 between a disc inner diameter (ID) 132 and a disc outer diameter (OD) 134.

Figure 2:
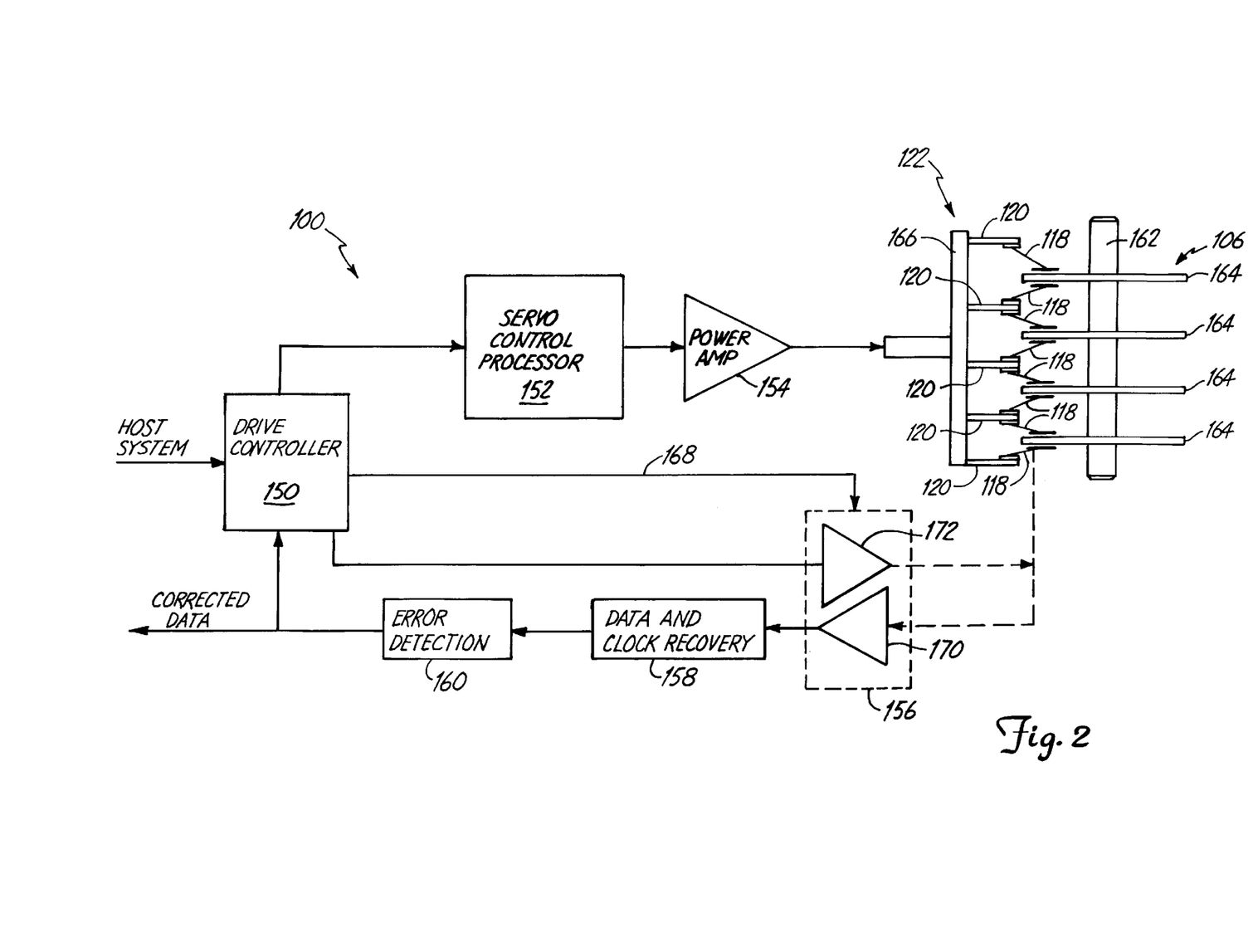
FIG. 2 is a simplified block diagram of the disc drive, which illustrates servo control circuitry in greater detail.

FIG. 2 is a simplified block diagram of disc drive 100, which illustrates the servo control circuitry in greater detail. Disc drive 100 includes drive controller 150, servo control processor 152, power amplifier 154, actuator assembly 122, disc pack 106, one or more preamplifiers 156, data and clock recovery circuit 158 and error detection circuit 160. Disc pack 106 includes spindle 162 which supports a plurality of coaxially arranged discs 164. Although only four discs 164 are shown in FIG. 2, disc pack 106 can include a larger number of discs, such as 14 discs. Each disc 164 has first and second surfaces with concentric data tracks for storing data in the form of flux reversals which are encoded on the tracks. Actuator assembly 122 includes base 166 which supports the plurality of track accessing arms 120. Each of the track accessing arms 120 is coupled to at least one of the suspensions 118, which supports a slider and its associated read and write heads proximate to a corresponding disc surface for accessing data within the tracks on the disc surface.

Drive controller 150 is typically a microprocessor or digital computer, and is coupled to a host system or another drive controller which controls a plurality of drives. In a read operation, drive controller 150 receives a command signal from the host system which indicates that a certain portion of one or more of discs 164 are to be accessed. In response to the command signal, drive controller 150 provides servo control processor 152 with a position signal which indicates a particular cylinder over which actuator assembly 122 is to position suspensions 118 and their associated read heads. Servo control processor 152 converts the position signal into an analog signal which is amplified by power amplifier 154 and is provided to actuator assembly 122. In response to the analog position signal, actuator assembly 122 positions suspensions 118 and their associated read heads over the desired cylinder.

Drive controller 150 also places preamplifier 156 in a read mode and provides a serial command signal to preamplifier 156 over a serial interface 168. The serial command signal indicates which read head or heads the data will be read from. The selected read head generates a read signal containing data which was encoded on the disc surface. The read signal is provided to read channel 170 of preamplifier 156, which amplifies the read signal and provides it to data and clock recovery circuit 158. Data and clock recovery circuit 158 recovers data from the read signal and provides the data to error detection circuit 160. Circuit 160 detects whether any errors have occurred in the data read back from the disc. Correctable errors are corrected by error detection circuit 160 or drive controller 150, or a combination of both, in a known manner.

In a write operation, drive controller 150 provides position information to servo control processor 152 causing actuator assembly 122 to position the write heads over a selected cylinder. Drive controller 150 places preamplifier 156 in write mode and provides the data to be written to a write channel 172 of preamplifier 156. Drive controller 150 also provides a serial write command to preamplifier 156 that indicates which write head or heads the data will be written to. Write channel 172 receives the data and writes the data to a disc surface through the selected write head by controlling the direction of current flowing through the head.

In a sector servo positioning drive, for example, a portion of each sector has position information which is read by the read head and provided to servo control processor 152. The position information gives tuning feedback to the servo control processor for better positioning. The position information is written to the disc surfaces through the write channels of preamplifiers 156 during manufacture of the disc drive. With high volume production, it is desirable to reduce the number of disc revolutions that is required to write the position information onto the disc pack since added revolutions directly translate to added time in the manufacturing process.

In the disc drive of the present invention, there are a plurality of preamplifiers 156 coupled to serial interface 168, and each of the preamplifiers can be addressed by drive controller 150 over the serial. interface either individually or simultaneously This allows the drive controller to address the preamplifiers individually during normal read and write operations and to address all the preamplifiers simultaneously in a "broadcast mode" when writing the position information to the disc pack.

Figure 3:
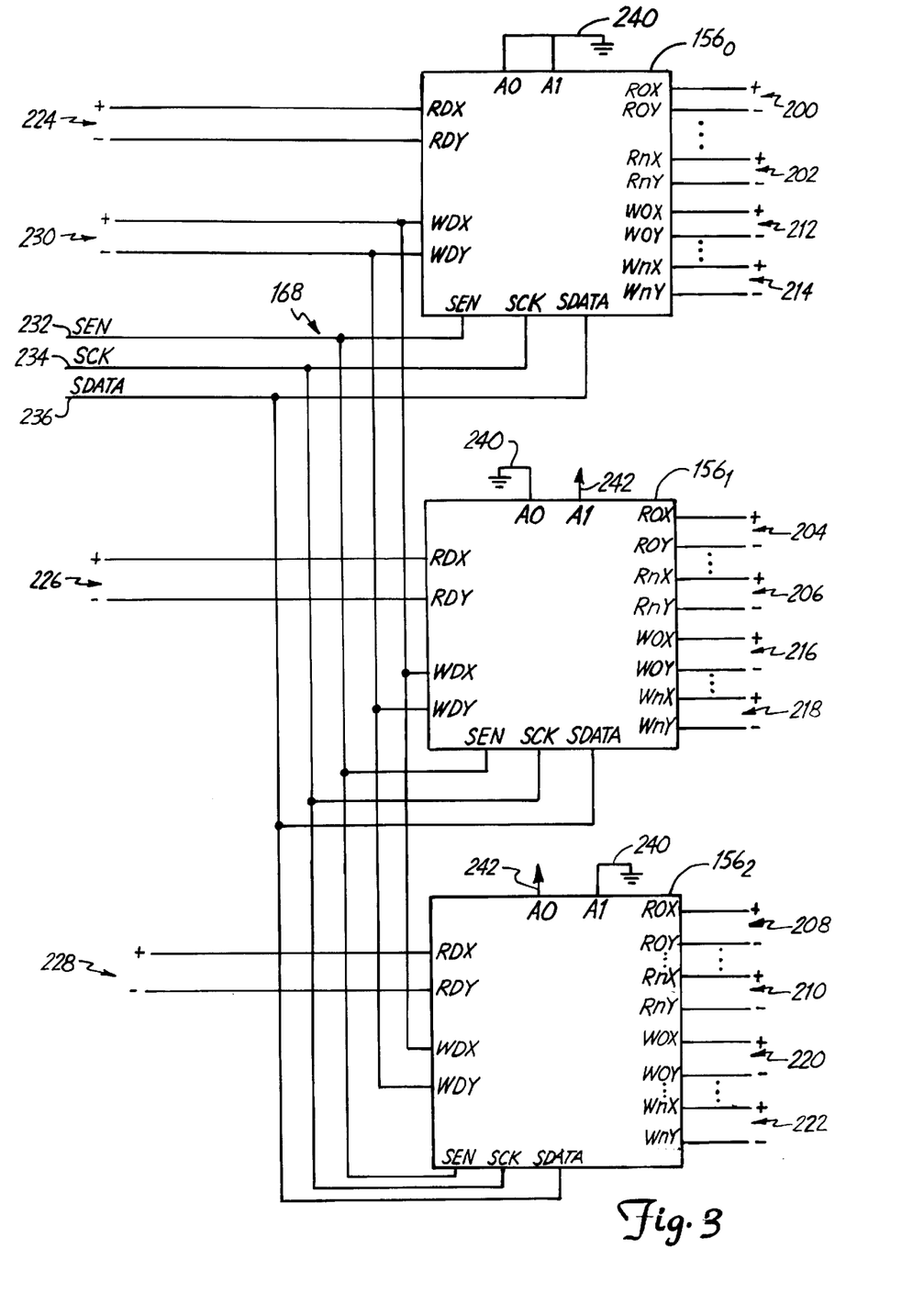
FIG. 3 is a block diagram of three preamplifiers within coupled together within the disc drive in accordance with one embodiment of the present invention.

FIG. 3 is a block diagram of three preamplifiers $156_0$–$156_2$ coupled together in accordance with one embodiment of the present invention. Each preamplifier $156_0$–$156_2$ has n-read channels and n-write channels which are enabled one at a time, in a multiplexed fashion. Each preamplifier $156_0$–$156_2$ has a plurality of inputs and outputs, including n-differential read data inputs ROX/ROY-RnX/RnY, n-differential write data outputs WOX/WOY-WnX/WnY, a pair of differential read data outputs RDX/RDY, and a pair of differential write data inputs WDX/WDY. The n-differential read data inputs ROX/ROY-RnX/RnY of preamplifiers $156_0$–$156_2$ are coupled to respective read heads over differential signal lines 200, 202, 204, 206, 208 and 210. The n-differential write data outputs WOX/WOY-WnX/WnY are coupled to respective write heads over differential signal lines 212, 214, 216, 218, 220 and 222. The differential read data outputs RDX/RDY of preamplifiers $156_0$–$156_2$ are coupled to data and clock recovery circuit 158 over differential signal lines 224, 226 and 228, respectively. The differential write data inputs WDX/WDY of preamplifiers $156_0$–$156_2$ are coupled in parallel to drive controller 150 over differential signal lines 230.

Preamplifiers $156_0$–$156_2$ further include a serial enable input SEN, a serial clock input SCLK and a serial data input SDATA which are coupled to drive controller 150 over serial control lines 232, 234 and 236. Serial control lines 232, 234 and 236 together form serial interface 168.

Finally, preamplifiers $156_0$–$156_2$ include preamplifier address inputs A0 and A1 which are tied to unique combinations of a first supply terminal 240 and a second supply terminal 242 to provide a unique logic pattern and thus a unique address for each preamplifier.

In the embodiment shown in FIG. 3, two address inputs are required to provide three unique logic patterns for the three preamplifiers $156_0$–$156_2$ and one universal logic pattern for all the preamplifiers. For example, address inputs A0 and A1 of preamplifier $156_0$ are both coupled to supply terminal 24C. Address input A0 of preamplifier $156_1$ is coupled to supply terminal 240 while address input A1 of preamplifier $156_1$ is coupled to supply terminal 242. Address input A0 of preamplifier $156_2$ is coupled to supply terminal 242 while address input A1 of preamplifier $156_2$ is coupled to supply terminal 240.

During operation, drive controller 150 enables serial interface 168 through a serial enable signal applied to control line 232 and provides a clock on control line 234 for controlling the serial communication with the preamplifiers. Drive controller 150 provides a multi-bit serial command to one or more of the preamplifiers on control line 236. The serial command has an address field and a data field. The bits in the address field select which of the preamplifiers $156_0$–$156_2$ will be enabled and select which head or heads the data will be written to or read from. The bits in the data field control operating conditions of the selected preamplifier such as the level of write current and the amount of overshoot, for example.

When preamplifiers $156_0$–$156_2$ receive a serial command over control line 236, each preamplifier compares a logic pattern formed by two of the bits in the address field with the unique logic pattern provided to the preamplifier address inputs A0 and A1. If there is a match, that preamplifier will be enabled and will respond to the serial command. Since the preamplifier address inputs A0 and A1 of preamplifiers $156_0$–$156_2$ are tied to unique combinations of logic states, each preamplifier can be addressed individually over the common serial interface 168.

In addition, each preamplifier $156_0$–$156_2$ compares the logic pattern formed by the two bits in the address field of the serial command to a universal logic pattern. If the two bits match the universal logic pattern, then all three preamplifiers $156_0$–$156_2$ will be enabled. This mode of operation is referred to as a broadcast mode which allows an override of the addressing scheme and allows all preamplifiers to respond simultaneously to the serial command. In the embodiment shown in FIG. 3, the universal logic pattern is defined by both bits in the address field of the serial command being a logic high.

Figure 4:
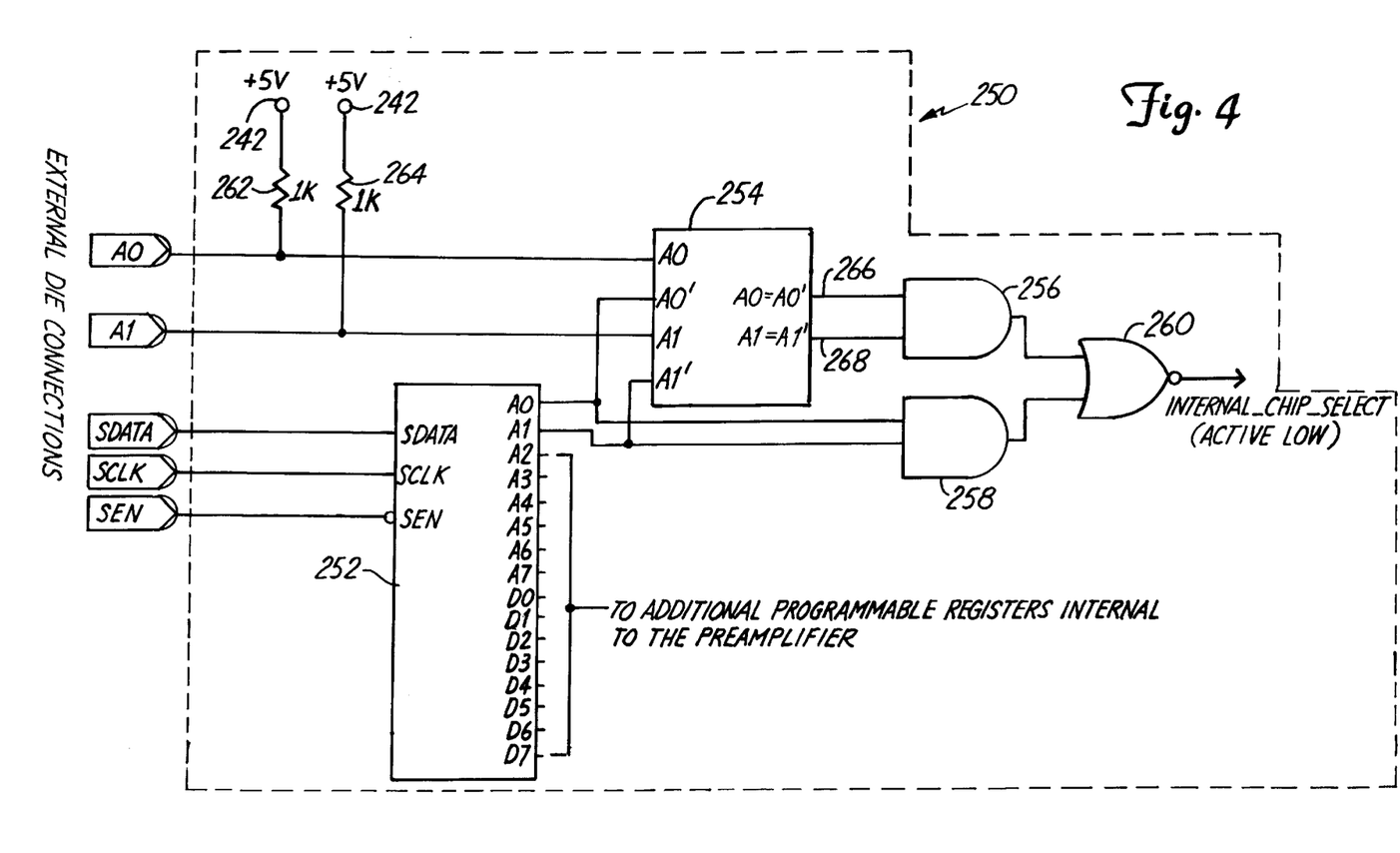
FIG. 4 is a partial block diagram of a serial interface circuit which is internal to each of the preamplifiers shown in FIG. 3.

FIG. 4 is a partial block diagram of a serial interface 250 within each preamplifier $156_0$–$156_2$. Serial interface 250 includes serial-to-parallel converter 252, digital comparator 254, AND gates 256 and 258, NOR gate 260 and pull-up resistors 262 and 264. Serial-to-parallel converter 252 receives the serial command on serial data input SDATA based on the clock signal received on serial clock input SCLK. Serial-to-parallel converter is enabled by the enable signal received on serial enable input SEN. In one embodiment, serial-to-parallel converter 252 includes a shift register.

In the embodiment shown in FIG. 4, the serial command includes eight address bits and eight data bits. The eight address bits are applied iii parallel to outputs to A0–A7 of serial-to-parallel converter 252. The eight data bits are applied in parallel to outputs D0–D7 of serial-to-parallel converter 252. Address outputs A2–A7 and data outputs D0–D7 are coupled to additional programmable registers (not shown) which are internal to the preamplifier. These additional programmable registers are used in a known manner to control the operation of the preamplifier as discussed above.

Address outputs A0 and A1 of serial-to-parallel converter 252 are reserved for addressing the preamplifier, and are coupled to inputs A0' and A1', respectively, of digital comparator 254 and to the inputs of AND gate 258. Preamplifier address inputs A0 and A1 are coupled to inputs A0 and A1 of digital comparator 254. Pull-up resistors 262 and 264 are coupled between supply terminal 242 and preamplifier address inputs A0 and A1, respectively.

Digital comparator 254 and AND gate 256 perform the individual addressing function of the preamplifier. Digital comparator 254 compares the logic states applied to inputs A0 and A0' of the comparator and provides the results of the comparison on output 266. Output 266 has a logic high state when A0 equals A0' and has a logic low state when A0 is different from A0'. Digital comparator 254 also compares the logic states of inputs A1 and A1' of the comparator and provides the results of the comparison on output 268. Output 268 has a logic high state when A1 equals A1' and has a logic low state when A1 is different from A1'. Outputs 266 and 268 are applied to the inputs of AND gate 256. AND gate 256 determines whether A0=A0' and A1=A1', and thus whether the address bits A0 and A1 of the serial command have a logic pattern that matches the unique logic pattern of the preamplifier.

Similarly, AND gate 258 is essentially a comparator which performs the broadcast mode addressing function. AND gate 258 determines whether the address bits A0 and A1 of the serial command are both a logic high and thus have a logic pattern that matches the universal logic pattern.

The outputs of AND gates 256 and 258 are applied to the inputs of NOR gate 260. The output of NOR gate 260 provides an internal, active-low chip select signal which enables the various components within the preamplifier when the address bits A0 and A1 of the serial command match either the unique logic pattern for that preamplifier or the universal logic pattern for all the preamplifiers. Table 1 is a truth table for the digital logic within serial interface 250:

TABLE 1

| A0 | A0' | A1 | A1' | Internal CS (Active Low) |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 0 |
| 0 | 1 | 0 | 0 | 1 |
| 0 | 1 | 0 | 1 | 0 Broadcast Mode (A0' & A1' = 1) |
| 0 | 1 | 1 | 0 | 1 |
| 0 | 1 | 1 | 1 | 0 Broadcast Mode (A0' & Al' = 1) |
| 1 | 0 | 0 | 0 | 1 |
| 1 | 0 | 0 | 1 | 1 |
| 1 | 0 | 1 | 0 | N Illegal State (A0 & A1 = 1) |
| 1 | 0 | 1 | 1 | N Illegal State (A0 & A1 = 1) |
| 1 | 1 | 0 | 0 | 0 |
| 1 | 1 | 0 | 1 | 0 Broadcast Mode (A0' & A1' = 1) |
| 1 | 1 | 1 | 0 | N Illegal State (A0 & A1 = 1) |
| 1 | 1 | 1 | 1 | N Illegal State (A0 & A1 = 1) |

Figure 5:
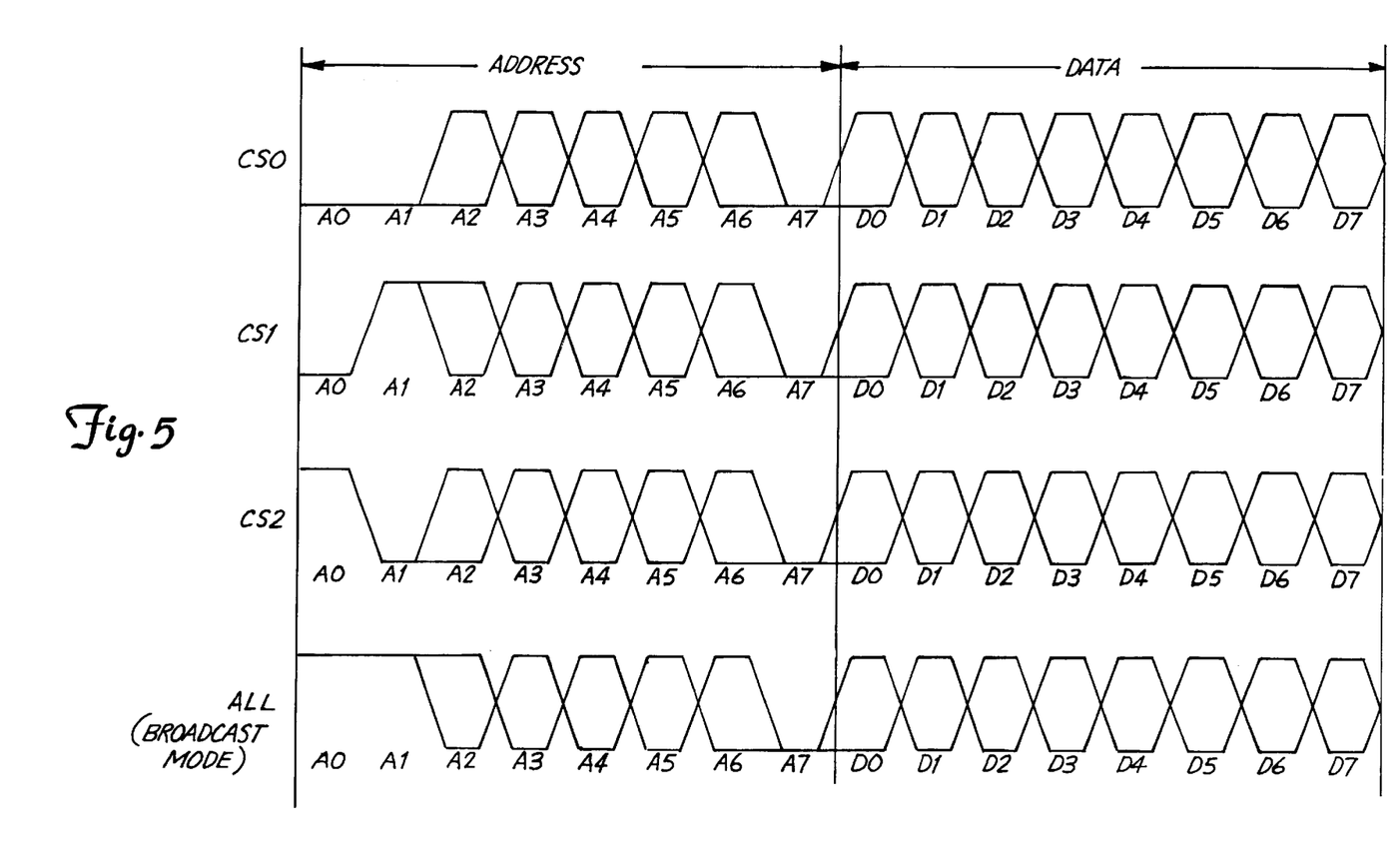
FIG. 5 is a timing diagram illustrating serial commands for selecting the preamplifiers shown in FIG. 3.

FIG. 5 is a timing diagram illustrating four serial commands, labeled CS0, CS1, CS2 and ALL. Serial command CS0 generates an individual, internal chip select for preamplifier $156_0$. Preamplifier $156_0$ has its preamplifier address inputs A0 and A1 both tied to a logic low level. Since address bits A0 and A1 of the serial command CS0 are both low, the internal chip select of preamplifier $156_0$ is enabled. Address bits A2–A6 and data bits D0–D7 are "don't care" states. Address bit A7 is a logic low, which indicates that the programmable registers of the selected preamplifier will be written to.

Serial command CS1 generates an individual, internal chip select for preamplifier $156_1$. Preamplifier $156_1$ has its preamplifier address inputs AO and A1 tied to logic low and logic high levels, respectively. Since address bit A0 of serial command CS1 is a logic low and address bit A1 of serial command CS1 is a logic high, the internal chip select of preamplifier $156_1$ is enabled.

Similarly, serial command CS2 generates an individual, internal chip select for preamplifier $156_2$. Preamplifier $156_2$ has its preamplifier address inputs A0 and A1 tied to logic high and logic low levels, respectively. Since address bit A0 of serial command CS1 is a logic high and address bit A1 of serial command CS1 is a logic low, the internal chip select of preamplifier $156_2$ is enabled.

Finally, the serial command ALL generates an internal chip select for all preamplifiers $156_0$–$156_2$, in the broadcast mode. Since address bits A0 and A1 of serial command ALL are both a logic high, which matches the universal logic pattern for the broadcast mode, the internal chip select of each preamplifier will be enabled.

The embodiments shown in FIGS. 3–5 allow for three unique chip selects for normal read and write operation and for a universal chip select in the broadcast mode. The broadcast mode is particularly beneficial for writing position information to the disc surfaces through each of the preamplifiers simultaneously during manufacture of the disc drive. This reduces the number of disc revolutions that is required to write the position information onto the disc surfaces. A reduced number of disc revolutions translates into a reduction in manufacturing time.

An advantage of the present invention is that each preamplifier can be addressed individually or simultaneously over the same serial interface without requiring additional connector pins and signal lines between the servo electronics and the actuator assembly. Limiting the number of pins and signal lines limits the spacial requirements for implementing the present invention and limits its susceptibility to noise.

One aspect of the present invention relates to a recording head preamplifier circuit having a plurality of preamplifiers $156_0$–$156_2$. Each preamplifier $156_0$–$156_2$ includes a receiver circuit 252 which receives a serial command SDATA having command address bits. A preamplifier enable circuit 254, 256, 258, 260 is coupled to the receiver circuit 252 and generates an enable output signal which enables the preamplifier when the command address bits match a first predetermined logic pattern which is unique to that preamplifier and when the command address bits match a second predetermined logic pattern which is universal to the plurality of preamplifiers.

In one embodiment, each receiver circuit has a serial command input which is coupled to the serial command inputs of the other receiver circuits. Preferably, the recording head preamplifier circuit further includes first and second supply terminals 240 and 242. Each preamplifier $156_0$–$156_2$ includes preamplifier address inputs A0 and A1 coupled to a combination of the first and second supply terminals 240 and 242 to form the first predetermined logic pattern. The receiver circuit 252 includes a serial-to-parallel converter which receives the serial command SDATA. The preamplifier enable circuit includes a first comparator circuit 254 and 256 which is coupled to the preamplifier address inputs A0 and A1 and the serial-to-parallel converter 252 and which generates a first comparator output signal based on a comparison of the first predetermined logic pattern formed on the preamplifier address inputs A0 and A1 and a logic pattern formed by corresponding ones of the command address bits received from the serial-to-parallel converter.

In a preferred embodiment, the serial command has first and second command address bits A0' and A1'. The first comparator circuit includes a digital comparator 254 and a first logical AND circuit 256. The digital comparator circuit 254 is operatively coupled to the first preamplifier address inputs A0 and A1 and to the serial-to-parallel converter 252. Digital comparator circuit 254 generates a first intermediate signal 266 based on a comparison cf the first preamplifier address input A0 and the first command address bit A0'. Digital comparator circuit 254 generates a second intermediate signal 268 based on a comparison of the second preamplifier address input A1 and the second command address bit A1'. The first logical AND circuit 256 is operatively coupled to the digital comparator 254, which generates the first comparator output signal based on a logical AND of the first and second intermediate signals 266 and 268 received from the digital comparator 254.

In the preferred embodiment, the preamplifier enable circuit further includes a second comparator circuit 258 which is operatively coupled to the serial-to-parallel converter 252 and which generates a second comparator output signal based on a comparison of the logic pattern formed by the first and second command address bits A0 and A1 and the second predetermined logic pattern. In one embodiment, the second comparator circuit 258 includes a logical AND circuit. In addition, the preamplifier enable circuit further includes a logical NOR circuit 260 coupled to the first and second comparator circuits, which generates the enable output signal based on a logical NOR of the first and second comparator output signals.

Another aspect of the present invention includes a recording head preamplifier $156_0$–$156_2$ including a write channel 172, a serial-to-parallel converter 252 and a comparison circuit 254, 256, 258 260. The serial-to-parallel converter 252 receives a serial command SDATA with first and second command address bits. The comparison circuit is operatively coupled to the serial-to-parallel converter 252 and generates a preamplifier enable signal which has an active state when the first and second command address bits match a first predetermined logic pattern and when the first and second command address bits match a second predetermined logic pattern.

Another aspect of the present invention includes a method of addressing a plurality of preamplifiers $156_0$–$156_2$ in a disc drive system 100. The method includes defining unique logic patterns for each of the preamplifiers $156_0$–$156_2$ and a universal logic pattern for the plurality of preamplifiers $156_0$–$156_2$. A serial command signal having a command address is transmitted to the plurality of preamplifiers simultaneously over a common serial command line 236. The method further includes enabling each preamplifier $156_0$–$156_2$ for which the command address matches the unique logic pattern of that preamplifier $156_0$–$156_2$, and enabling the plurality of preamplifiers $156_0$–$156_2$ if the command address matches the universal logic pattern.

Yet another aspect of the present invention includes a disc drive 100 having a housing 102, 104 and a drive controller 150. The drive controller 150 generates a multi-bit serial command which has command address bits. A plurality of recording surfaces are rotatably coupled to the housing 102, 104. An actuator assembly 122 is supported within the housing 102, 104. A plurality of heads is carried by the actuator assembly 122 relative to the plurality of recording surfaces. A plurality of preamplifiers $156_0$–$156_2$ are operatively coupled between the drive controller 150 and the plurality of heads. Each preamplifier $156_0$–$156_2$ receives the multi-bit serial command from the drive controller 150 and has an enabled state when the command address bits match a first predetermined logic pattern which is unique to that preamplifier and when the command address bits match a second predetermined logic pattern which is universal to the plurality of preamplifiers $156_0$–$156_1$.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular number of address bit used for the chip select function may vary depending on the number of discs, heads and preamplifiers used in particular application while maintaining substantially the same functionality without departing from the scope and spirit of the present invention. In addition, although the preferred embodiment described herein is directed to servo writing operations, it will be appreciated by chose skilled in the art that the teachings of the present invention can be applied to a broadcast mode for normal read and write operations, if desired, without departing from the scope and spirit of the present invention. Also, the particular interface control circuitry disclosed in the figures is provided as an example only. Various other logic circuits and configurations can be used in other embodiments of the present invention, and the logic functions can be implemented in software if desired.

What is claimed is:

1. A recording head preamplifier circuit comprising a plurality of preamplifiers, wherein each preamplifier comprises:
   a receiver circuit which has a serial command input adapted to receive a serial command having command address bits; and
   a preamplifier enable circuit operatively coupled to the receiver circuit and adapted to generate an enable output signal which enables the preamplifier when the command address bits match a first predetermined logic pattern which is unique to that preamplifier and when the command address bits match a second predetermined logic pattern which is universal to the plurality of preamplifiers.

2. The recording head preamplifier circuit of claim 1 the serial command inputs of the plurality of preamplifiers are coupled to one another.

3. The recording head preamplifier circuit of claim 1 and further comprising first and second supply terminals and wherein:
   each preamplifier further comprises preamplifier address inputs coupled to a combination of the first and second supply terminals to form the first predetermined logic pattern;
   the receiver circuit comprises a serial-to-parallel converter coupled to the serial command input, which receives the serial command and provides the command address bits as parallel outputs; and
   the preamplifier enable circuit comprises a first comparator circuit coupled to the preamplifier address inputs and to the serial-to-parallel converter, which generates a first comparator output signal based on a comparison the first predetermined logic pattern formed on the preamplifier address inputs and a logic pattern formed by the command address bits on the parallel outputs of the serial-to-parallel converter.

4. The recording head preamplifier circuit of claim 3 wherein:
   the serial command has first and second command address bits;
   the preamplifier address inputs comprise first and second preamplifier address inputs; and
   the first comparator circuit comprises:
      a digital comparator operatively coupled to the first and second preamplifier address inputs and to the serial-to-parallel converter, which generates a first intermediate signal based on a comparison of the first preamplifier address input and the first command address bit and which generates a second intermediate signal based on a comparison of the second preamplifier address input and the second command address bit; and
      a first logical circuit operatively coupled to the digital comparator, which generates the first comparator output signal based on a logical "AND" of the first and second intermediate signals received from the digital comparator.

5. The recording head preamplifier circuit of claim 3 wherein the preamplifier enable circuit further comprises:
   a second comparator circuit operatively coupled to the serial-to-parallel converter and generating a second comparator output signal based on a comparison of the logic pattern formed by the corresponding command address bits received from the serial-to-parallel converter and the second predetermined logic pattern.

6. The recording head preamplifier circuit of claim 5 wherein the second comparator circuit comprises a logical AND circuit.

7. The recording head preamplifier circuit of claim 5 wherein the preamplifier enable circuit further comprises a logical NOR circuit coupled to the first and second comparator circuits, which generates the enable output signal based on a logical NOR of the first and second comparator output signals.

8. A recording head preamplifier comprising:
   a write channel;
   a serial command input which is adapted to receive a serial command with first and second command address bits;
   a serial-to-parallel converter which is operatively coupled to the serial command input; and
   a comparison circuit operatively coupled to the serial-to-parallel converter, which is adapted to generate a preamplifier enable signal that has an active state for enabling the write channel when the first and second command address bits match a first predetermined logic pattern and when the first and second command address bits match a second predetermined logic pattern.

9. The recording head preamplifier of claim 8 and further comprising:
   first and second preamplifier address inputs which form the first predetermined logic pattern; and
   wherein the comparison circuit comprises:
      a first digital comparison circuit operatively coupled to the first and second preamplifier address inputs and the serial-to-parallel converter, which generates a first comparison signal that is representative of a comparison of the first and second command address bits and the first predetermined logic pattern;
      a second digital comparison circuit operatively coupled to the serial-to-parallel converter, which generates a second comparison signal that is representative of a comparison of the first and second command address bits and the second predetermined logic pattern; and
      a preamplifier enable circuit coupled to the first and second digital comparison circuits, which generates the preamplifier enable signal.

10. The recording head preamplifier of claim 9 wherein the first digital comparison circuit comprises:
   a digital comparator which generates a first intermediate signal based on a comparison of the first preamplifier enable input and the first command address bit and which generates a second intermediate signal based on a comparison of the second preamplifier enable input and the second command address bit; and a logical AND circuit operatively coupled to the digital comparator, which generates the first comparison signal based on a logical AND of the first and second intermediate signals.

11. The recording head preamplifier of claim 9 wherein the second digital comparison circuit comprises a logical AND circuit operatively coupled to the serial-to-parallel converter, which generates the second comparison signal based on a logical AND of the first and second command address bits.

12. The recording head preamplifier of claim 9 wherein the preamplifier enable circuit comprises a logical NOR circuit operatively coupled to the first and second digital comparison circuits, which generates the preamplifier enable signal based on a logical NOR of the first and second comparison signals.

13. The method of addressing a plurality of preamplifiers in a disc drive system, the method comprising:

(a) defining unique logic patterns for each of the preamplifiers and, a universal logic pattern for the plurality of preamplifiers;

(b) transmitting a serial command signal to the plurality of preamplifiers simultaneously over a common serial command line, the serial command signal having a command address;

(c) enabling each preamplifier for which the command address matches the unique logic pattern of that preamplifier; and (d) enabling the plurality of preamplifiers if the command address matches the universal logic pattern.

14. The method of claim 13 wherein the command address has a plurality of address bits and wherein steps (c) and (d) comprise comparing a selected set of the address bits to the unique and universal logic patterns, respectively.

15. The method of claim 13 and further comprising:

receiving the serial command signal in a shift register within each of the plurality of preamplifiers, the shift register having a plurality of bits; wherein step (a) comprises providing each preamplifier with preamplifier address inputs and operatively coupling the preamplifier address inputs to a selected combination of reference voltages which corresponds to the unique logic pattern of that preamplifier; and wherein step (c) comprises comparing selected bits of the shift register to the preamplifier address inputs.

16. The method of claim 13 and further comprising:

receiving the serial command signal in a shift register within each of the plurality of preamplifiers, the shift register having a plurality of bits; and wherein step (d) comprises applying selected bits of the shift register to a digital logic circuit within each of the plurality of Preamplifiers, which generates an output as a function of whether the selected bits form the universal logic pattern.

17. A disc drive comprising:

a housing;

a drive controller which generates a multi-bit serial command having command address bits;

a plurality of recording surfaces rotatably coupled to the housing;

an actuator assembly supported within the housing;

a plurality of heads carried by the actuator assembly relative to the plurality of recording surfaces; and a plurality of preamplifiers which are operatively coupled between the drive controller and the plurality of heads, each preamplifier having a serial command input for receiving the multi-bit serial command from the drive controller and having an enabled state when the command address bits match a first predetermined logic pattern which is unique to that preamplifier and when the command address bits match a second predetermined logic pattern which is universal to the plurality of preamplifiers.

* * * * *

UNITED STATES PATENT AND TRADEMARK OFFICE
CERTIFICATE OF CORRECTION

PATENT NO. : 5,986,841
DATED : November 16, 1999
INVENTOR(S) : Scott G. Sorenson It is certified that error appears in the above-identified patent and that said Letters Patent is hereby corrected as shown below:

Title page, item

[57]          Abstract

Line 9, after "which is unique to" delete "chat" and insert --that--.

Col. 9, line 33, after "claim 1" insert --wherein--.

Col. 9, line 51, before "the" (first instance), insert --of--.

Col. 11, line 17, delete "The", and insert --A--.

Col. 11, line 38, after "bit;" insert new paragraph beginning with "wherein step (a) . . ."

Col. 12, line 15, delete "Preamplifiers", and insert --preamplifiers--.

Signed and Sealed this

Twenty-seventh Day of February, 2001

Attest:

NICHOLAS P. GODICI

Attesting Officer      Acting Director of the United States Patent and Trademark Office